United States Patent
Chen

(10) Patent No.: US 10,234,070 B2
(45) Date of Patent: Mar. 19, 2019

(54) FITTING STRUCTURE FOR SUPPLY OF GAS

(71) Applicant: Chi-Wen Chen, New Taipei (TW)

(72) Inventor: Chi-Wen Chen, New Taipei (TW)

(*) Notice: Subject to any disclaimer, the term of this patent is extended or adjusted under 35 U.S.C. 154(b) by 337 days.

(21) Appl. No.: 15/197,799

(22) Filed: Jun. 30, 2016

(65) Prior Publication Data

US 2018/0003336 A1 Jan. 4, 2018

(51) Int. Cl.
*F16L 59/18* (2006.01)
*F16L 33/30* (2006.01)

(52) U.S. Cl.
CPC ............. *F16L 59/182* (2013.01); *F16L 33/30* (2013.01)

(58) Field of Classification Search
CPC ....... F16L 33/24; F16L 33/245; F16L 47/005; F16L 47/06; F16L 59/166; F16L 59/182
USPC ............... 285/47–55, 222.1–222.5, 238, 239
See application file for complete search history.

(56) References Cited

U.S. PATENT DOCUMENTS

| | | | | |
|---|---|---|---|---|
| 2,447,900 A | * | 8/1948 | Crawley | F16L 33/24 285/18 |
| 3,814,466 A | * | 6/1974 | Leopold, Jr. | F16L 55/165 285/246 |
| 4,094,536 A | * | 6/1978 | Cole | F16L 47/04 285/148.13 |
| 6,409,227 B1 | * | 6/2002 | Lu | F16L 11/127 138/109 |
| 2013/0133565 A1 | * | 5/2013 | Chen | G01L 7/166 116/266 |

* cited by examiner

*Primary Examiner* — James M Hewitt, II
(74) *Attorney, Agent, or Firm* — Leong C. Lei

(57) ABSTRACT

A fitting structure is provided for supply of gas and connectable between an air supply tube in the form of a hose or a plastic pipe and an air outlet of an air compressor and includes a fitting and a thermal insulation tube. The fitting includes a first coupling opening connectable with the air outlet of the air compressor and a second coupling opening connectable with the air supply tube. The thermal insulation tube has a first end part fixed inside the second coupling opening of the fitting and a second end part extending outside the second coupling opening such that a portion of the thermal insulation tube that extends outside the second coupling opening is received in the interior of the air supply tube. High-temperature air from the air compressor is conducted through the thermal insulation tube into the air supply tube without being directly applied to the fitting.

6 Claims, 5 Drawing Sheets

FITTING STRUCTURE FOR SUPPLY OF GAS

(a) TECHNICAL FIELD OF THE INVENTION

The present invention relates generally to a fitting structure for supply of gas, and more particularly to one that is applied to a hose or plastic pipe of an air compressor for supply of air, in which a fitting that is coupled to an air outlet of the air compressor is additionally provided with a thermal insulation tube fixed thereto such that an extended length and a property of temperature resistance of the thermal insulation tube allow air (high-temperature gas) generated and supplied from the air compressor to be directly conducted through the thermal insulation tube into an interior of an air supply tube, whereby the effect of isolation and extended performance of lowering temperature for the high-temperature air by the thermal insulation tube helps prevent the high temperature from directly applying to a connection site between the fitting and the air supply tube and thus eliminate issues related to aging resulting from repeated thermal expansion and contraction and help improve stability of the connection between the fitting and the air supply tube.

(b) DESCRIPTION OF THE PRIOR ART

An air pressurization device, such as an air compressor, is provided for pressurizing or compressing air to increase air pressure and is commonly applicable in various fields that need compressed or pressurized air, such as inflation of vehicle wheels, steel industry, electronics, light industries, machine manufacturing, paper making and printing, and casting and spray coating.

The general operation of an air compressor is based on a motor that drives the compressor in such a way that an internal crankshaft is caused to undergo rotary motion for driving a link bar that drives a piston to reciprocally move up and down thereby causing variation of internal volume of a cylinder and thus compressing air.

Through variation of the internal pressure of the cylinder, air is drawn in through an air intake valve and passes through an air filter to get into the cylinder. During a compression stroke, the volume of the cylinder is being reduced so that air is compressed and forced through a discharge valve to flow through a discharge tube and a one-way valve to get into a storage canister. When the discharge pressure reaches a rating pressure, a pressure switch controls the compressor to shut down. When the pressure inside the storage canister drops below a rating pressure level, the pressure switch is automatically turned on for activation again.

Based on such a principle of operation, during the operation of the air compressor, the piston is kept in high-speed reciprocal motion so that a high temperature may be induced due to friction between the piston and internal surface of the cylinder. Such a high temperature is generally in proportion to the operation time so that the compressed air generated and supplied would therefore be in a high temperature form when discharged from the air outlet of the air compressor.

As shown in FIG. 1, a conventional air compressor is provided with an air supply tube that is generally a hose or a plastic pipe connected to an air outlet of the air compressor with a fitting A connecting therebetween. The fitting A has an end that forms a first connection terminal A1 connectable to the air outlet of the air compressor. The fitting A has an opposite end that forms a second connection terminal A2 connectable to an air supply tube B so that air supplied from the air compressor is conducted through the air supply tube B to an external apparatus or machine. However, the conventional fitting A of the air compressor is structured to have the second connection terminal A2 directly fit to and thus connected with the air supply tube B so that being influenced by high-temperature air generated and supplied from the air compressor, the second connection terminal A2 of the fitting A and the fitting connection between the air supply tube B (which is a hose or a plastic pipe) and the second connection terminal A2 would be long affected by the high-temperature air to undergo repeated thermal expansion and contraction, eventually leading to undesired expansion and thus leaking of air and getting loosened, so that the stability of the connection between the fitting A and the air supply tube B deteriorates. Further, the fitting connection between the air supply tube B and the second connection terminal A2 may get quick aging due to being long affected by the high temperature, and eventually get harden (brittle), thereby affecting the service life of the air supply tube B.

SUMMARY OF THE INVENTION

In view of the above problem, the present invention aims to provide a fitting structure for supply of gas, and more particularly one that is mounted to an air outlet of the air compressor to protect a connection between the fitting and an air supply tube from being influenced by high-temperature air that leads to insufficient stability of connection between the fitting and the air supply tube and aging and thus affects the service life of the air supply tube.

A fitting structure for supply of gas according to the present invention comprises a fitting and a thermal insulation tube. The fitting has an end forming a first coupling opening for connection with an air outlet of an air compressor. The fitting has an opposite end forming a second coupling opening for connection with an air supply tube. The thermal insulation tube is formed of a temperature-resistant material and has a length greater than a length of the fitting. The first end part of the thermal insulation tube is fixed inside the second coupling opening of the fitting. The second end part of the thermal insulation tube extends outwards and projects outside the second coupling opening such that a portion of the thermal insulation tube that extends outside the second coupling opening is receivable in the interior of the air supply tube.

An efficacy of the present invention is that the thermal insulation property and the extended length of the thermal insulation tube helps conduct high-temperature air generated and supplied from the air compressor through the thermal insulation tube to get into the interior of the air supply tube so that the thermal insulation tube may provide an effect of extended lowering of the temperature of the high-temperature air and also help prevent a connection site between the fitting and the air supply tube from directly receiving the high temperature thereby eliminating issues related to thermal expansion and contraction, fast aging, and leaking of the fitting.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
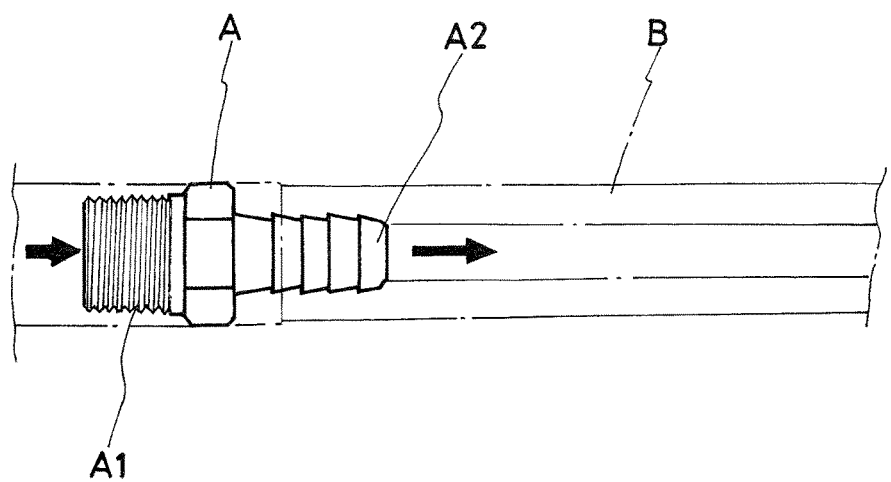
FIG. 1 is a schematic view illustrating a conventional fitting of an air outlet of an air compressor in a state of use.
Figure 2:
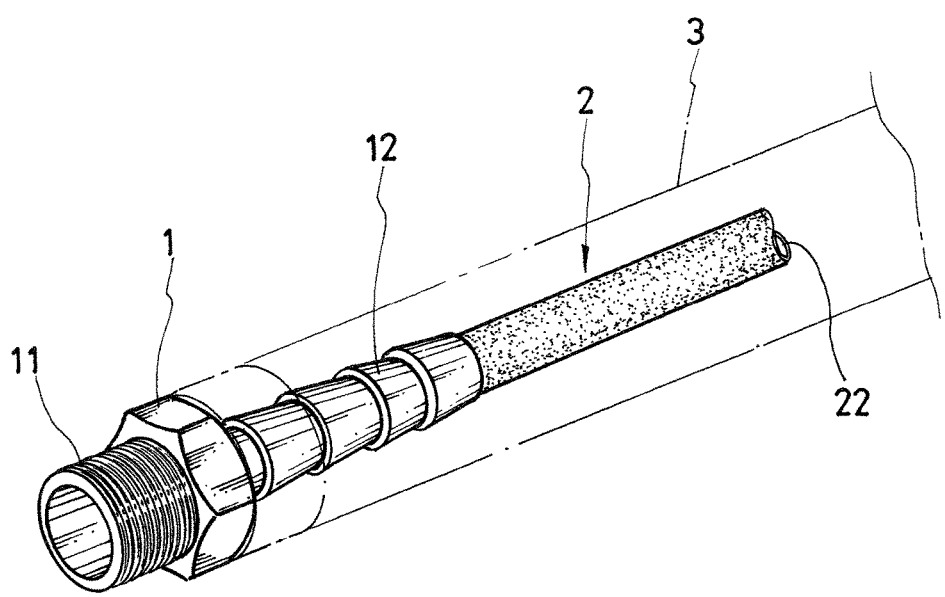
FIG. 2 is a perspective view showing a fitting structure according to the present invention.
Figure 3:
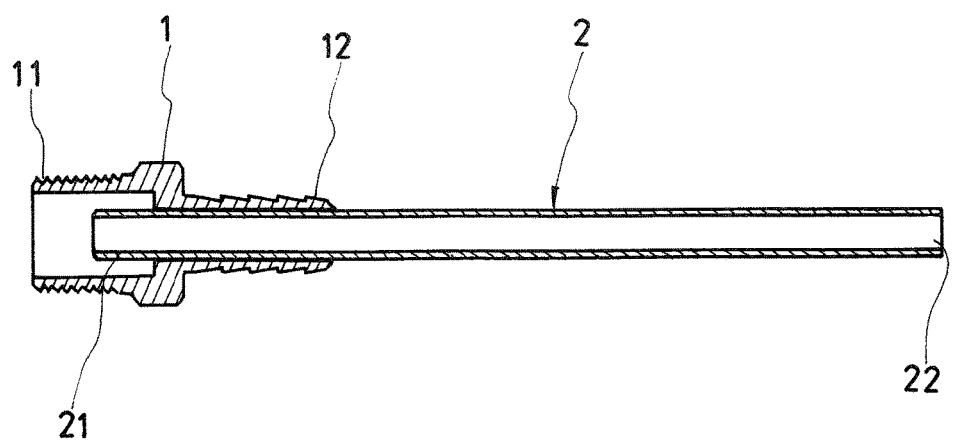
FIG. 3 is a cross-sectional view showing a first example of the fitting structure of the present invention.
Figure 5:
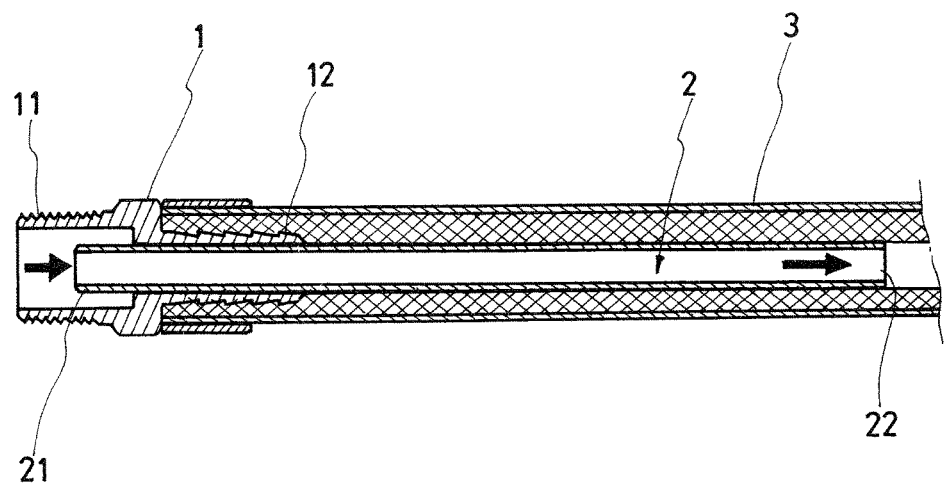
FIG. 5 is a cross-sectional view showing an application of the fitting structure of the present invention.

Referring to FIGS. 2, 3, and 5, the present invention discloses a fitting structure for supply of gas, and particularly one that is mounted to an air outlet of an air compressor to serve as a connection between the air compressor and an air supply tube 3. The air supply tube 3 is in the form of a hose or a plastic pipe. The fitting structure comprises a fitting 1 and a thermal insulation tube 2.

The fitting 1 has an end that forms a first coupling opening 11 and an opposite end that forms a second coupling opening 12. The first coupling opening 11 is connectable with the air outlet of the air compressor, and the second coupling opening 12 is connectable with the air supply tube 3.

The thermal insulation tube 2 is mounted to the fitting 1. The thermal insulation tube 2 is formed of a temperature-resistant material (such as a Teflon pipe) and has a length greater than a length of the fitting 1. The thermal insulation tube 2 has one end that forms a first end part 21 and an opposite end that forms a second end part 22. The first end part 21 is fixed inside the second coupling opening 12 of the fitting 1 and the second end part 22 extends outward and projects beyond the second coupling opening 12. A portion of the thermal insulation tube 2 that extends outside the second coupling opening 12 is arranged in the interior of the air supply tube 3.

As shown in FIG. 3, an example of the present invention is illustrated, wherein the first end part 21 of the thermal insulation tube 2 is fixed inside the second coupling opening 12 of the fitting 1 by means of for example adhesives or tight fitting.

Figure 4:
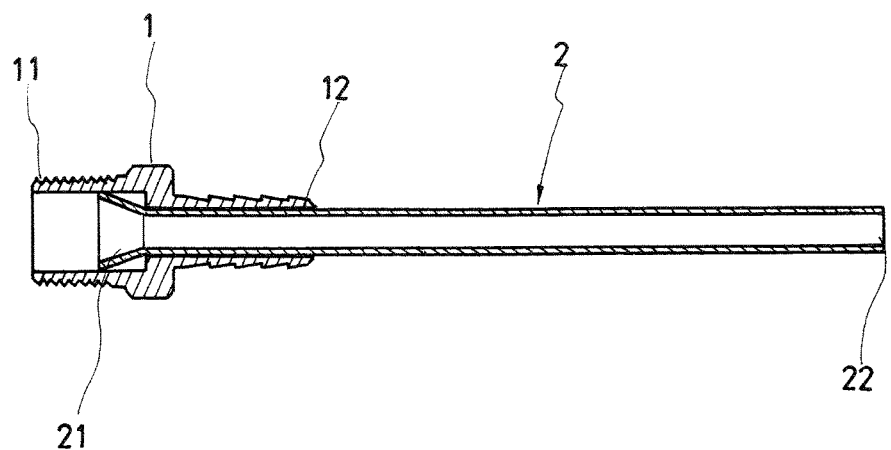
FIG. 4 is a cross-sectional view showing a second example of the fitting structure of the present invention.

Referring to FIG. 4, another example of the present invention is illustrated, wherein an end opening of the first end part 21 of the thermal insulation tube 2 is structured to flare outward in a divergent form to form an expanded portion such that a diameter of the first end part 21 of the thermal insulation tube 2 is greater than a diameter of the second coupling opening 12 of the fitting 1. When the thermal insulation tube 2 is put through and thus coupled to the fitting 1, the outward flaring or expansion of the first end part 21 of the thermal insulation tube 2 secures fixed coupling inside the fitting 1.

The fitting 1 is connected, via the first coupling opening 11, to the air outlet of the air compressor, and the fitting 1 is connected, via the second coupling opening 12, to the air supply tube 3. The portion of the thermal insulation tube 2 that extends outside the second coupling opening 12 is set in the interior of the air supply tube 3. As such, the thermal insulation tube 2 that is formed of a temperature-resistant material and the thermal insulation tube 2 has a relatively great length, high-temperature air generated and discharged from the air compressor is conducted through the thermal insulation tube 2 into the air supply tube 3.

Since the air supply tube 3 is a tube having some length, when the high-temperature air is guided through the thermal insulation tube into the air supply tube 3, the high temperature of the air may be distributed and dissipated through the air supply tube 3 to thereby get dropped down and thus preventing the connection site between the fitting 1 and the air supply tube 3 from directly receiving the high temperature and undergoing thermal expansion and aging. Thus, stability of the connection between the fitting 1 and the air supply tube 3 can be enhanced and lifespan can be increased.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A fitting structure for supply of gas, which is adapted to be mounted to an air outlet of an air compressor to receive air discharged from the air compressor, the fitting structure comprising:
   a fitting, which has an end forming a first coupling opening and an opposite end forming a second coupling opening, the first coupling opening being connectable with the air outlet of the air compressor, the second coupling opening being connectable with an air supply tube by having an end of the air supply tube fit over and coupled to the second coupling end of the fitting; and
   a thermal insulation tube, which is mounted to the fitting, the thermal insulation tube having an end forming a first end part and an opposite end forming a second end part, the first end part being fixed inside the second coupling opening of the fitting, the second end part being arranged to extend outside the second coupling opening such that a portion of the thermal insulation tube that extends outside the second coupling opening is received in interior of the air supply tube and has a distal tip of the second end part located distant from the second coupling end of the fitting;
   wherein the air supply tube is directly coupled to the second coupling end of the fitting with an end thereof fit over the second coupling end, the thermal insulation tube extends from the second coupling end of the fitting to be received in the interior of the air supply tube, in a manner of being spaced radially from the air supply tube, to have the distal tip thereof located distant from the second coupling end of the fitting, and the fitting is adapted to receive the air discharged from the air pump and conducts the air through the thermal insulation tube to have the air fed from the distal tip of the second end part of the thermal insulation tube into the air supply tube at a location distant from the second coupling end of the fitting and the end of the air supply tube fit over the second coupling end of the fitting.

2. The fitting structure according to claim 1, wherein the thermal insulation tube has a length greater than a length of the fitting.

3. The fitting structure according to claim 1, wherein the first end part of the thermal insulation tube is fixed inside the second coupling opening of the fitting by means of adhesive.

4. The fitting structure according to claim 1, wherein the first end part of the thermal insulation tube is fixed inside the second coupling opening of the fitting by means of tight fitting.

5. The fitting structure according to claim 1, wherein the first end part of the thermal insulation tube has an end opening that is flared out to form an expanded portion such that a diameter of first end part of the thermal insulation tube is greater than a diameter of the second coupling opening of the fitting.

6. The fitting structure according to claim 5, wherein the flared-out end of the first end part of the thermal insulation tube securely fixes inside the fitting.

\* \* \* \* \*